United States Patent [19]
Krueger

[11] Patent Number: 5,531,958
[45] Date of Patent: Jul. 2, 1996

[54] PROCESS FOR IMPROVING THE DEBINDING RATE OF CERAMIC AND METAL INJECTION MOLDED PRODUCTS

[75] Inventor: David C. Krueger, Grosse Ile, Mich.

[73] Assignee: BASF Corporation, Mount Olive, N.J.

[21] Appl. No.: 544,149

[22] Filed: Oct. 17, 1995

Related U.S. Application Data

[63] Continuation of Ser. No. 130,223, Oct. 1, 1993, abandoned.

[51] Int. Cl.$^6$ .................................................. B22F 3/10
[52] U.S. Cl. ........................ 419/44; 419/36; 419/37; 419/41; 419/53
[58] Field of Search .......................... 419/36, 37, 41, 419/44, 53

[56] References Cited

U.S. PATENT DOCUMENTS

| | | | |
|---|---|---|---|
| 5,032,354 | 7/1991 | Nakanishi et al. | 419/23 |
| 5,043,121 | 8/1991 | Wingefeld | 264/82 |
| 5,073,319 | 12/1991 | Sterzel | 264/101 |
| 5,080,846 | 1/1992 | Kim et al. | 264/109 |
| 5,145,900 | 9/1992 | Sterzel et al. | 524/404 |
| 5,155,158 | 10/1992 | Kim | 524/424 |
| 5,188,782 | 2/1993 | Bittler et al. | 264/82 |
| 5,198,489 | 3/1993 | Sterzel et al. | 524/439 |
| 5,280,086 | 1/1994 | Kawamoto et al. | 525/398 |

*Primary Examiner*—Donald P. Walsh
*Assistant Examiner*—John N. Greaves
*Attorney, Agent, or Firm*—Nixon & Vanderhye

[57] ABSTRACT

The present invention provides a method of increasing debinding rates in Powder Injection Molding of metal and ceramic parts by use of a catalytic binding system.

28 Claims, 2 Drawing Sheets

PROCESS FOR IMPROVING THE DEBINDING RATE OF CERAMIC AND METAL INJECTION MOLDED PRODUCTS

This is a continuation of application Ser. No. 08/130,223, filed Oct. 1, 1993, now abandoned.

BACKGROUND OF THE INVENTION

1. Field of the Invention

The present invention relates to methods for improving the debinding rates of ceramic and metal forms which use a polymeric binder system for powder injection molding.

2. Background of the Prior Art

Metal Injection Molding (MIM) and its counterpart for Ceramic Injection Molding (CIM) are structural part fabrication technologies that combine the design flexibility and high volume, relative low cost processing of plastic molding with the material properties of ceramics and metals. MIM and CIM are near net shape processes that require little or no post processing. These two technologies are sometimes referred to as Powder Injection Molding (PIM). See, for example, U.S. Pat. Nos. 4,624,812; 5,080,846; 5,155,158; and 5,043,118.

PIM adopts the low cost, precision molding process developed for thermoplastic polymers and adapts it to the precision shaping of structural metals, alloys, ceramics, cemented compositions and microstructures such as ceramic reinforced intermetallic matrix composites.

Certain processes are currently used instead of MIM. These include metal working (machining), investment casting (precision casting), and powder metallurgy (press and sinter).

Machining is generally favored when the number of parts to be made are small. The flexibility and inexpensive set-up cost of machining gives it an economic advantage at low production rates. However, as the required production volume increases, the increase in labor cost causes other processes to be favored.

Powder forging, press and sinter are generally favored in the production of components at low cost and high production rates. However, the level of detail and complexity that can be designed into these parts is limited. Simple geometries like transmission gears can be produced at very high production rates and low cost using this process. Without special post processing these parts tend to be porous and have a lower density.

Investment casting can generate a wide variety of cast part sizes. Large parts are more favorably produced using investment casting because of its raw material cost advantage. Smaller parts in general require more post-finishing which offsets the initial raw material advantage of investment casting. Part design is in general more limited with investment casting verses MIM.

MIM processing is generally most beneficial in high performance situations, for the production of components with complicated designs and where high productivity is desired. CIM is often the only process available to produce the desired ceramic components, since ceramics can not be melt processed.

In the debinding processes available for PIM, thermal debinding, or pyrolysis, is can be used for very small parts. The green part is heated in a closely controlled oven up to a temperature just below the softening point of the binder. The heating rate must be relatively slow to prevent thermal stresses and/or "melting/softening" of the parts. The binders designed for pyrolysis are often a combination of waxes, organic acids, and polyolefin polymers. Often there are several temperatures that the parts are held at to pyrolyze a given component of the binder.

While the capital costs are relatively low for a pyrolysis oven, the debinding rate and process tends to be very slow and there is part distortion. Control of the oven temperature must be uniform to obtain even debinding of the parts, and to avoid distortion defects caused by softening/melting of the parts. For example, a ¼" thick part can take days to properly debind by pyrolysis. In addition, there are thickness limitations with pyrolysis also. Thick parts debind very slowly. At part thicknesses much above ⅜" the debinding rate drops toward zero due to capillary condensation.

Solvent debinding is an alternative process that improves the debinding rate verses pyrolysis. The parts are immersed in liquid or vapor of an extracting solvent. The solvent accelerates the removal of binder from the parts and helps open-up porosity in the part. Solvent debinding still requires that the residual binder and solvent must be removed from the part thermally.

The advantage of solvent debinding is that it increases the debinding rate of the parts over pyrolysis. However, the disadvantages of the process include solvent disposal. An added concern is that many of today's solvents contain chlorine and are being phased out because of the concerns with the ozone layer and the Montreal protocol.

In addition, there is part distortion due to excessive softening of the green part. In conventional debinding processes the binder is softened by heating or solvent action. Allowing the part to become too soft results in distortion or "slumping". Generally, the closer the part is to the slumping point, the faster the debinding rate. Hence, there is a compromise between debinding rate and dimensional stability. This also means that the uniformity and control of the temperature within the debinding process becomes very critical.

Further, the sintering time must also be increased to remove the residual binder and solvent remaining in the part after the process.

With solvent debinding the debinding rate decreases with thicker parts. The practical thickness limit generally falls between ⅜" and ¾" depending on the part configuration and the specific binder system being used.

The most recently developed process of debinding is catalytic debinding. (See U.S. Pat. No. 5,073,319). In catalytic debinding a catalyst is used to break the binder into small volatile molecules. These molecules have a higher vapor pressure than the binder fragments generated in other debinding processes (pyrolysis or solvent debinding) and diffuse more rapidly out of the part.

The catalyst must be present to promote the debinding. This promotes a very uniform and rapid debinding from the exterior surface into the center of the part.

Catalytic debinding is faster, with debinding rates up to 40 times that of other techniques such as pyrolysis or solvent debinding. There is no thickness limit with catalytic debinding. The small molecules generated by the catalytic process have a high vapor pressure. This greatly minimizes the potential for capillary condensation and allows thick part sections to be debound. For example, thicknesses over 1" have been successfully processed.

As with pyrolysis and solvent debinding the debinding rate does decrease as the component or part thickness is increased. This decrease in the debinding rate has been attributed to capillary condensation and to a diffusion limited process. It has been therefore thought that a high purge gas flow rate through the debinding oven is needed to optimize the debinding rate.

The debound part is sintered at high temperature. At about half the melting temperature of the material, the powdered metals or ceramic powders coalesce together to form the final non-porous part. Sintering can be performed under inert, or reducing atmospheres, or under vacuum.

The PIM fabrication step that has been the greatest hindrance to wider application of MIM is debinding. Debinding has had several problems associated with it. While debinding via catalytic debinding is much faster than pyrolysis or solvent debinding, debinding is still a relatively slow process with debinding times generally of between about 3 to 48 hours for relatively thin (~3 mm) MIM parts.

While the debinding time for thick parts is often the practical limit, there is also a technical limit for debinding PIM parts usually explained as capillary condensation. This phenomena is believed to cause the debinding rate to drop toward zero for thicker parts, thus further lengthening the process.

In view of the limitations of long debinding times, there is a need for Powder Injection Molding process which provides a reduced debinding rate but still provides a high density, non-porous molded product.

SUMMARY OF THE INVENTION

Surprisingly, it has been found that the debinding rate can be controlled by controlling the catalyst concentration within the debinding zone. It has been found that the debinding rate is directly proportional to the purge rate. In one aspect of this invention, the rate of debinding is increased by decreasing the purge rate. In another aspect of this invention, the concentration of the catalyst in the debinding zone is increased by decreasing the purge rate of inert gas. In yet another aspect of the invention, by controlling the concentration of the catalyst, a catalyst having a lower catalytic concentration than used in previous processes can now be used in the present invention by reducing the purge gas flow rate to hold the concentration of the neat or active catalyst in the debinding zone at the same levels as when a pure catalyst is added in the debinding zone. Finally the rate of debinding for a PIM part has been significantly improved over prior technology across all part thickness ranges allowing a significant improvement in production rates.

DETAILED DESCRIPTION OF THE PREFERRED EMBODIMENTS

Figure 1:
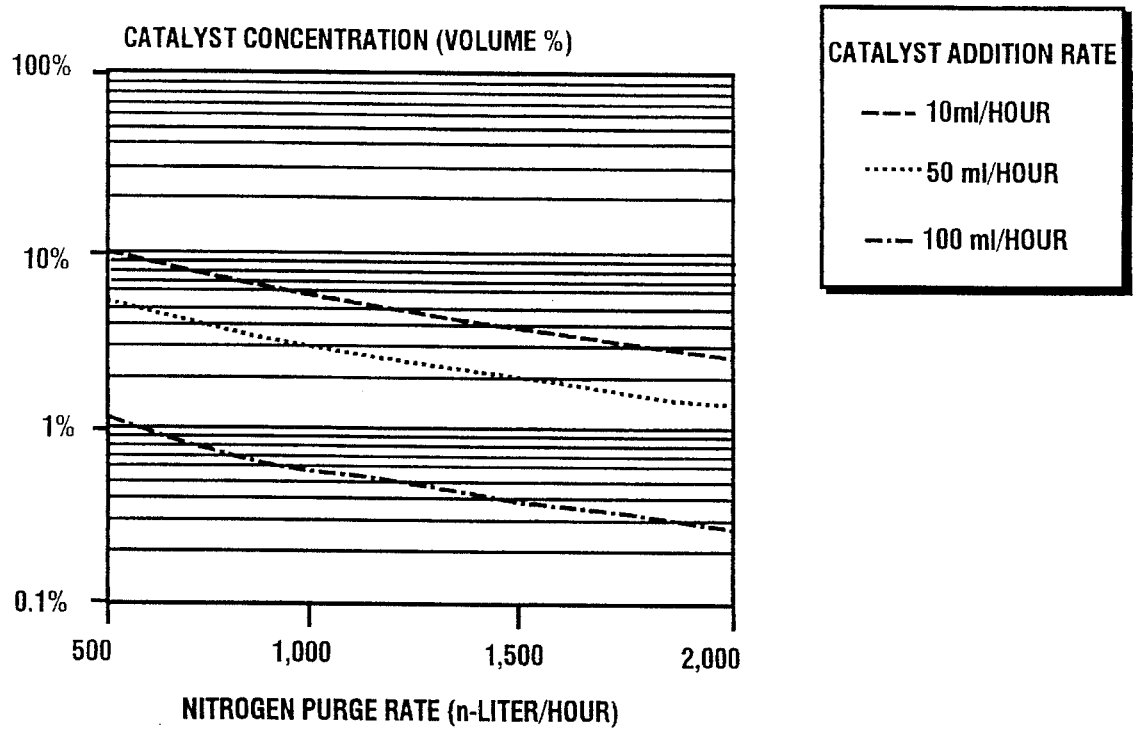
FIG. 1 illustrates a graph of the neat catalyst concentration within the debinding zone vs. purge flow rate and catalyst addition rates. These values are determined using a constant stirred tank reactor or CSTR model described later.

As used herein, the term "debinding" means the process of removing the organic binder (continuous phase) from the molded part.

As used herein, the term "green part" refers to the part after it has been molded, but before the debinding step or process.

Powder Injection Molding (PIM) is a manufacturing technique applicable to a wide variety of materials and uses. It provides for net shaping materials ranging from low carbon steels to intermetallic compounds, including traditional ceramics, high temperature ceramics and refractory metals. At present there is a large spectrum of applications that includes tools, microelectronic packages, firearm components, automotive parts, and biomedical instruments.

The present preferred invention comprises a process for increasing the debinding rate of molded parts in powder injection molding by use of an oven with a circulation means, a catalyst delivery system, a catalyst, a mold feedstock comprising a polymeric binder, a purge gas supply, and an after-burner. The oven is purged with a purge gas and heated to a temperature of below the softening point of the polymeric binder. Typically the temperature is between about 90° to about 190° C. A controlled amount of the catalyst is added to the oven to effect debinding of the mold feedstock and to form a debound mold. Formaldehyde is a by-product of this debinding reaction and is eliminated from the oven via the afterburner. The purge gas and catalyst are circulated throughout the oven by means of a circulating means such as a fan.

The fabrication steps involved in PIM production are well known. The PIM process generally involves processing steps of compounding, molding, debinding, and sintering.

Compounding is the process of mixing the binder with a powdered ceramic or metal to form the feedstock. Generally, the production of the metal and/or ceramic powder is a separate process that is done by a dedicated supplier. The PIM feedstock is made by compounding powder together with a binder at a very high solids loading, generally at about 60 vol %.

Feedstock useful in the present invention may be purchased in the form of factory pre-blended in ready to mold pellets, or granules. With a conventional MIM system one has to develop, and/or buy a binder formulation.

Binders are typically combinations of low melting waxes and polyolefin polymers although other mixtures are also useful. Compounding can be done using a batch mixer, or a continuous mixer like a twin screw extruder. However, it is important that the resulting mix have a uniform consistent density and component distribution.

The consistency of the feedstock is one of the most important parameters in PIM. An uneven distribution of the powder in the binder will result in a loss of part dimensional control, and/or variations in part density. Variations in the feedstock consistency batch to batch will also result in loss of part dimensional control.

The preferred feedstock of the invention should have high green strength, dimensional stability during debinding, good moldability, wide processing window, recycleablity, clean processing and a rapid debinding rate. Using a feedstock with high green strength can be used to shorten the molding cycle, and to allow the molding process to be automated. The feedstock should have a wide operation window for molding to maintain a high process yield.

The preferred feedstock is based on a polyacetal engineering resin, which gives the green molding great strength. A catalytic debinding process is used with this binder to reduce the debinding cycle.

The preferred binder in the feedstock used in the present invention is polymeric and most preferably, essentially polyacetal polymer. The polymer is available commercially from BASF Corporation under the trademark ULTRAFORM®. The binder used for MIM and CIM are modified versions of this well known high performance engineering resin. The simple chemical structure of a polyacetal polymer is:

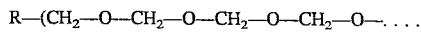

$R-(CH_2-O-CH_2-O-CH_2-O-CH_2-O-\ldots$

The binder system is commercially available from BASF Corporation under the trade name BASF PIM FEEDSTOCK.

Feedstocks for carbonyl iron, and elemental carbonyl iron/nickel compositions are commercially available. Pre-alloyed compositions are available for Stainless steel (i.e. 316L), hardenable steels (i.e. 17-4PH), and other compositions. Ceramic feedstocks are available for aluminum oxide, silicone nitride, and zirconia. Additional feedstock grades are also in development and are also suitable for use in the present invention.

The present invention uses a feedstock which uses a catalytic debinding process to rapidly debind the green MIM and CIM moldings below the melting temperature of the binder. This process is disclosed in U.S. Pat. No. 4,624,812, and hereby incorporated by reference.

The catalytic debinding results in the advantages of improved dimensional stability during debinding, and a very rapid rate of debinding. This eliminates the compromise between debinding rate and part dimensional stability. For example, by debinding at a temperature about well below the binder's softening point, debinding rates of 6 mm/Hr can be maintained. This translates into debinding a ½ inch (12.5 mm) thick MIM molding in about one hour. For ceramic parts debinding rates between 1 to 2 mm/Hr can be maintained for thick parts. This translates to debinding a ½ inch thick (12.5 mm) CIM molding in about four hours.

These PIM feedstocks can be molded using conventional injection molding equipment to produce void free moldings. The molding parameters are well within the normal operation parameters. The tooling used for PIM is much the same as that used for plastics except the tool is sized to account for the shrinkage of the green part during sintering. The binder is removed during the debinding process, leaving the powder behind in the shape of the molded part. Since the pore structure of the green part is initially filled by the binder, debinding occurs at the binder interphase. This eliminates the build-up of pressure inside part during debinding that can lead to cracking and voids in the sintered part.

It is preferred that because of the mold temperatures required are above the boiling point for water, an "oil" mold heater should be used for safe and quality processing.

A catalyst must be present for the debinding to proceed. The debinding process is controlled by catalyst addition. The debinding agent is considered to be a catalyst due to the volumes used being very low and the process line being small (⅛ to ¼" diameter). Only enough catalyst needs to be added into the system to maintain the desired catalyst level.

Preferred catalysts include any acids that can depolymerize the polymer under the process conditions of the oven. These include, for example, mineral acids, and particularly, nitric acid, $BF_3$, organic acids, and the like. In addition, an advantageous feature of the invention allows the use of a wide range of catalyst concentrations without impairing the rate of debinding. Catalyst concentrations that are suitable include a pure 100 wt % concentration, but are advantageously 95 wt % or less, and more preferably less than 90 wt %, and most preferably less than 80 wt %.

Typically, polyacetals are used as binders because of their high strength and good chemical resistance properties. It is believed that when a polyacetal is used as a binder for PIM, the acetal linkages in the polymer are be attacked catalytically by an acid. The polymer is taken apart by a rapid hydrolysis of the terminal group.

The debound polymer fragments or "broken chain links" are essentially pure formaldehyde. Formaldehyde is a low molecular weight gas that has a high vapor pressure. This combination allows very high mass transfer rates. The low molecular weight aids rapid diffusion of the formaldehyde out of the parts, and the high vapor pressure virtually eliminates the "capillary condensation" effect that tends to retain the binder in the pore structure. In other words it is an ideal combination for rapid debinding.

Polyacetal polymers typically are thermally stable at temperatures up to about 450° F. (230° C.), while the melting, or softening temperatures are between about 340° to about 360° F. (about 170° to about 180° C.). The use of the debinding catalyst allows the polymer to be depolymerized and debinded or debound, at temperatures between about 200° to about 300° F. (about 100° to about 150° C.), which is well below the softening point of the polymeric binder. Debinding can be performed at about 150° F. (80° C.) below the softening point of the binder. The low temperature significantly eliminates dimensional distortion during debinding and greatly reduces the need for exacting oven/process temperature control during debinding.

The process for catalytic debinding has a wide operating range. The process basically requires an oven, a catalyst delivery system, a purge gas supply, and an after-burner.

Because the catalysts used for debinding are acidic the internal construction of a debinding oven should be made of 304 steel. An internal recirculation fan/system is used to distribute the catalyst within the oven and to provide a uniform temperature. As stated before, this temperature control is not as critical as with conventional systems. The oven must be air tight to prevent air infiltration and leakage during the debinding cycle. This process may be performed on a batch or continuous basis, with the continuous process using an oven designed to process materials continuously, while maintaining the parameters discussed above.

The debinding catalyst is preferably supplied to the oven using a small positive displacement pump. A ceramic piston pump works well because it has good chemical resistance to the acid, and because the delivery rate can be easily adjusted by changing the stroke length or speed. The lines feeding the catalyst to the process should also be acid resistant, such as teflon tubing.

The effluent from the debinding process is consumed in an afterburner. The formaldehyde generated during debinding can be efficiently consumed in a simple torch type afterburner.

An inert purge gas is used and may be any inert gas or vapor, but preferably nitrogen, argon, helium and the like, as well as mixtures thereof, and most preferably argon or nitrogen. The inert purge gas is used in the process to ensure that the generated formaldehyde is flushed from the oven during and after a debinding run. The inert purge gas is also used to purge oxygen out of the oven prior to starting debinding. This is done to prevent a flammable mixture of formaldehyde and oxygen from occurring in the oven. The dew point of this nitrogen supply is not critical. Debound metal parts also known as "brown" parts, are then sintered at high temperature. In the case of MIM, the sintering process causes the powders coalesce to form the final non-porous part.

In conventional debinding systems the debinding rate is largely controlled by the temperature of operation. The higher the debinding temperature the faster the debinding rate. This operating parameter is limited or constrained by the problem of increasing dimensional distortion as the softening point of the binder is approached.

With catalytic debinding the debinding rate is affected by the catalyst addition rate, the purge rate, and the operating temperature. This provides the manufacturer much flexibility.

The temperature range useful in the present invention is bounded by the softening point of the binder as the upper limit, and by proximity to the condensation temperatures of the vapors in the oven as the lower limit. The temperature range for the catalytic debinding process is preferably between about 240° to about 340° F. (about 115° to about 170° C.). Within this normal operating range, the catalytic debinding process is only weakly affected by the debinding temperature. The most preferred temperature for an increased debinding rate is between about 265° to about 320° F. (about 130° to about 160° C.).

The operation of a batch debinding oven can be described using the reactor model Continuous Flow Stirred Tank Reactor (CSTR). This model assumes a batch oven or batch reactor that is well mixed. Furthermore, it assumes that the inlet streams are quickly (i.e. instantaneously) mixed within the oven. Hence the oven and outlet streams have the same composition at any given time.

The calculated acid concentration in the CSTR oven may be determined using the following relationship:

$$C_{cat} = \int_0^T \{V_{cat}/V_{cat} + V_{purge}\}\exp[(-t/\tau)/\tau]dt$$

Where the time constant $\tau$ is:

$\tau=$ (volume of the oven)/(volumetric flow rate through oven)

$T=$ Active Debinding Time $V_{cat}=$ volumetric flow of catalyst (neat)

$V_{purge}=$ volumetric flow of purge and other "inert" gas flows

The varying generation of formaldehyde (during the cycle) in the oven and imperfect mixing within the oven sometimes does violate the assumptions of this model. However, the model does provide a reasonable and practical method to approximate the behavior of the system. Use of this calculation then shows that after a "short" transition time the oven concentration approaches the steady state aggregate composition of the inlet stream(s).

$$C_{cat} = V_{cat}/(V_{cat} + V_{purge})$$

With this information, the catalyst concentration can be approximated for various combinations of process parameters. See, C. G. Hill, Jr., *An Introduction to Chemical Engineering Kinetics & Reactor Design*, John Wiley & Sons, 1977, pps. 247–252, 405–407. Thus, as shown in FIG. 1, the catalyst concentration can be plotted for varying purge and catalyst addition rates.

By adjusting the level of debinding catalyst in the oven to less than about 4.0 vol. %, and more preferably between about 0.7 to about 4.0 vol. %, the debinding rate for PIM parts can range from about 1 mm/Hr up to about 6 mm/Hr (using a carbonyl iron powder based feedstock with a particle size of about 5 u). This control gives the manufacturer a large amount of freedom in controlling timing of the PIM process. The catalyst level in the oven can be controlled using the catalyst addition rate, the purge rate, or a combination of these two parameters.

Figure 2:
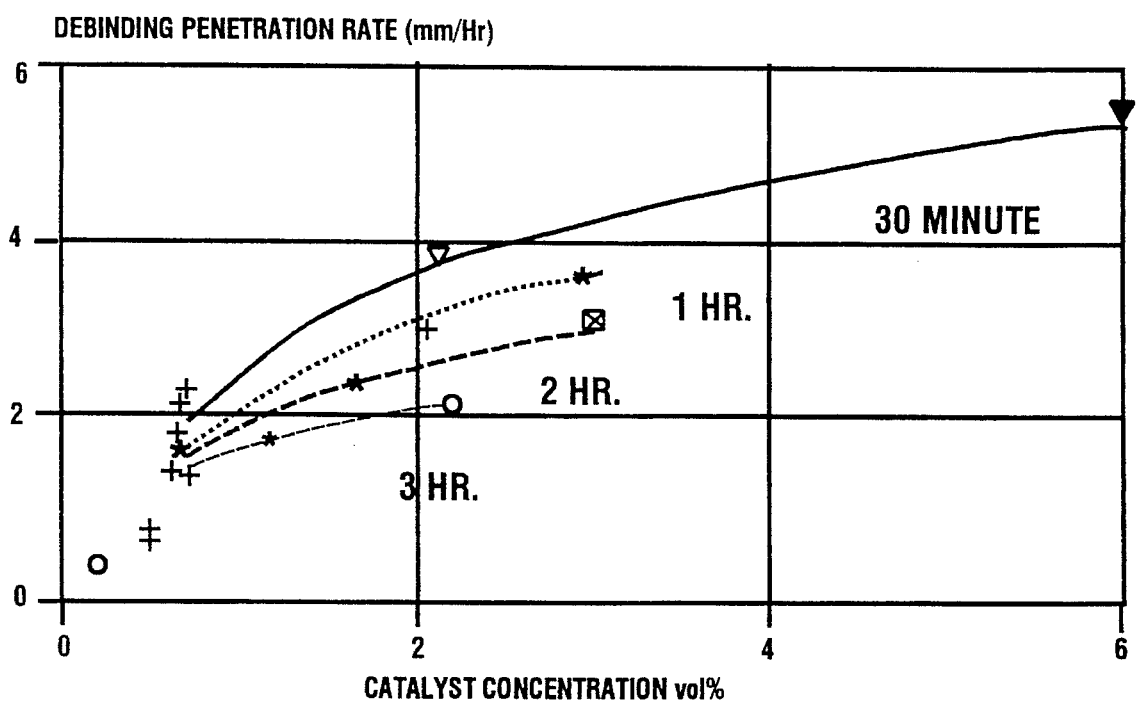
FIG. 2 illustrates a graph of the catalyst concentration within the debinding zone vs. the average debinding penetration rate.

Increasing the catalyst level will increase the debinding rate in the oven. A plot of these data are shown in FIG. 2. The data shows a very consistent change in the debinding rate versus thickness (or penetration). Thus, the debinding rate is greatly affected by the catalyst concentration. It was found that average debinding rates greater than 4 mm/Hr can be maintained through a ½ inch thick cross-section. This translates into debinding a ½ inch thick part in about one hour.

EXAMPLES

Example 1

Using the calculations described above, a series of experiments were designed to investigate how the catalyst affected the debinding rate. For the experiment ¾"×½" square Feedstock FE bars were debound for ½, 1, 2, or 3 hours at selected catalyst concentrations. The debinding penetration was determined by cutting through the debound layer to the remaining binder core. The debinding depth was then measured directly using a micrometer. The % weight loss was also recorded.

Figure 3:
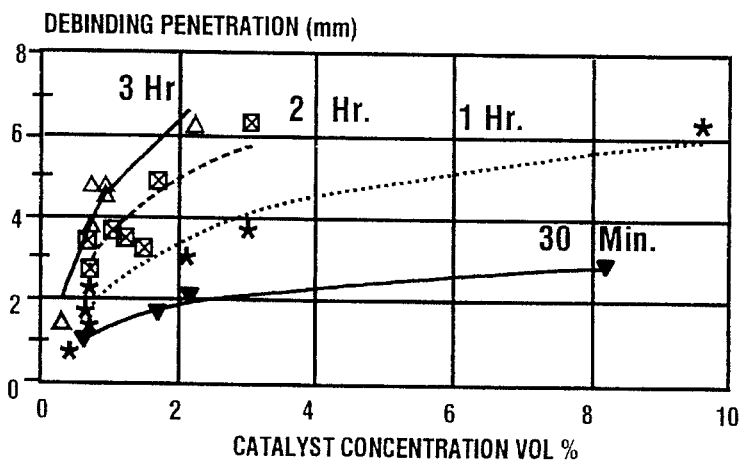
FIG. 3 illustrates a graph of the debinding penetration of the present invention vs. the catalyst concentration within the debinding zone. The purge flow rate and the catalyst addition rates were adjusted to obtain the designated oven catalyst concentrations.
Figure 4:
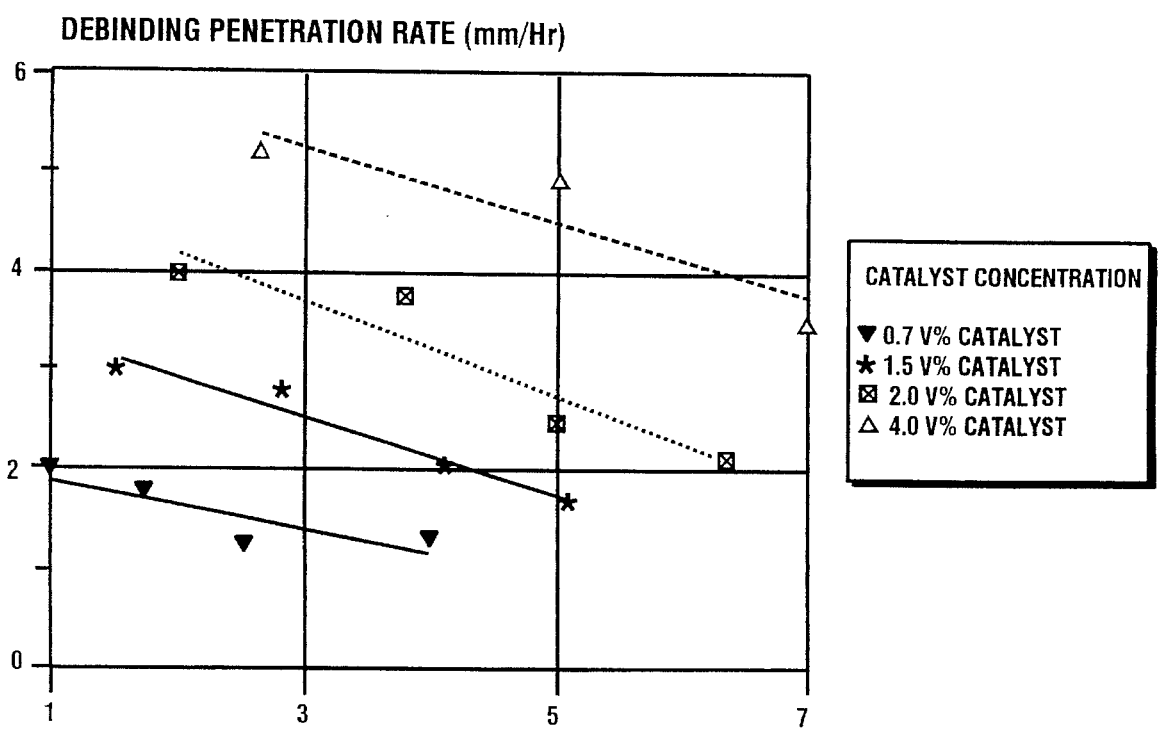
FIG. 4 illustrates a cross-plot of FIG. 2 of the average debinding rate vs. part thickness (and/or penetration) at selected debinding zone catalyst concentrations.

It was found that the level of catalyst has a tremendous effect on accelerating the debinding rate for MIM and CIM parts. In FIG. 3 the debinding penetration is plotted. Note the maximum penetration depth (6.35 mm) corresponds to half the thickness of the test samples. These data are cross-plotted from the data provided in FIG. 2 in FIG. 4 shows the average debinding rate verses the catalyst level. This plot shows that the initial debinding rate is very fast and also significantly faster than other debinding methods.

Example 2

The following Table shows the results of processing metal and ceramic forms using the process of the present invention. As is seen from this Table, an adjustment in the catalyst concentration provides an effective adjustment of the debinding rate. Runs 1–8 are metal and 9–14 are ceramic (aluminum oxide bars).

| Run | Sample Size (inches) | Avg. Rate (mm/hr) | Depth mm | Mass wt loss % |
|---|---|---|---|---|
| 1 | .5 × .5 × 5.0 | 1.98 | 0.99 | 4.07 |
| 2 | .5 × .5 × 3/8 | 1.50 | 4.5 | 9.80 |
| 3 | " | 1.60 | 4.81 | 9.65 |
| 4 | .5 × .25 × 1.0 | 1.10 | >3.17 | 10.50 |
| 5 | .25 × .5 × 5.0 | 1.60 | >3.17 | 9.95 |
| 6 | .5 × .5 × .75 | 2.12 | >6.35 | ND |
| 7 | Odd Block | 2.55 | 5.1 | 9.09 |
| 8 | .5 × .5 × .75 | 3.18 | 6.35 | ND |
| 9 | .5 × .5 × 1.0 | 1.14 | 5.7 | 19.00 |
| 10 | " | 1.14 | 4.55 | 17.80 |
| 11 | " | 1.19 | 4.75 | 17.50 |
| 12 | " | 1.58 | 6.3 | 17.70 |

-continued

| Run | Sample Size (inches) | Avg. Rate (mm/hr) | Depth mm | Mass wt loss % |
|-----|----------------------|-------------------|----------|----------------|
| 13  | "                    | 1.28              | 3.85     | ND             |
| 14  | "                    | 1.20              | 2.4      | ND             |

Catalyst Parameters

| Run | HNO₃ Equil. % vol. | Oven Residence "Tau" min. | Conc. wt % | HNO₃ Rate (ml/hr) |
|-----|--------------------|---------------------------|------------|-------------------|
| 1   | 0.57               | 2.15                      | 70.0       | 15                |
| 2   | 0.92               | 2.24                      | 90.0       | 17.2              |
| 3   | 0.86               | 2.35                      | 90.0       | 16.1              |
| 4   | 0.80               | 5.89                      | 90.0       | 6.0               |
| 5   | 1.48               | 4.57                      | 70.0       | 18.0              |
| 6   | 3.93               | 4.33                      | 90.0       | 38.0              |
| 7   | 3.93               | 4.33                      | 90.0       | 38.0              |
| 8   | 3.93               | 4.33                      | 90.0       | 38.0              |
| 9   | 3.21               | 4.31                      | 70.0       | 40.0              |
| 10  | 3.13               | 4.32                      | 70.0       | 39.0              |
| 11  | 4.12               | 4.31                      | 90.0       | 40.0              |
| 12  | 4.12               | 4.31                      | 90.0       | 40.0              |
| 13  | 3.93               | 4.33                      | 90.0       | 38.0              |
| 14  | 3.93               | 4.33                      | 90.0       | 38.0              |

Oven Parameters Temperatures in °C.

| Run | Debinding Time (hr) | Purge Rate (nLiter/hr) | Purge Temp. | Oven Temp. |
|-----|---------------------|------------------------|-------------|------------|
| 1   | 0.5                 | 1000                   | 150         | 150        |
| 2   | 3.5                 | 1000                   | 150         | 150        |
| 3   | 3.0                 | 1000                   | 130         | 130        |
| 4   | 3.0                 | 400                    | 130         | 130        |
| 5   | 2.0                 | 500                    | 130         | 130        |
| 6   | 3.0                 | 500                    | 135         | 130        |
| 7   | 2.0                 | 500                    | 140         | 130        |
| 8   | 2.0                 | 500                    | 140         | 130        |
| 9   | 5.0                 | 500                    | 130         | 130        |
| 10  | 4.0                 | 500                    | 130         | 130        |
| 11  | 4.0                 | 500                    | 135         | 130        |
| 12  | 4.0                 | 500                    | 135         | 130        |
| 13  | 3.0                 | 500                    | 135         | 130        |
| 14  | 2.0                 | 500                    | 140         | 130        |

Whereas particular embodiments of the invention have been described above for purposes of illustration, it will be appreciated by those skilled in the art that numerous variations of the details may be made without departing from the invention as described in the appended claims.

What is claimed is:

1. A process for controlling debinding of a powder injection molded part formed of a powder injection molding feedstock which includes a polymeric binder, said process comprising:
   (a) placing the molded part to be debound in a debinding oven;
   (b) introducing a purge gas into the oven so as to purge the oven with the purge gas;
   (c) heating the oven to an oven operating temperature below the softening point of the polymeric binder; and
   (d) introducing a debinding catalyst into the oven to effect debinding of the molding feedstock and to form a debound mold and formaldehyde; and
   (e) controlling the catalyst level within the oven to less than about 4.0 vol. % by controlling at least one of (i) the volumetric rate at which the purge gas is introduced into the oven, and (ii) the volumetric rate at which the catalyst is introduced into the oven to thereby achieve a debinding rate of between about 1 mm/Hr to about 6 mm/hr.

2. The process of claim 1, wherein the molding feedstock is a metal.

3. The process of claim 2, additionally comprising sintering the debound mold to form a metallic molded product.

4. The process of claim 1 wherein the molding feedstock is a ceramic.

5. The process of claim 1 wherein the oven is heated to temperatures between about 200° to about 300° F.

6. The process of claim 1 wherein the polymer is a polyacetal polymer.

7. The process of claim 6 wherein the polyacetal polymer is based on the formula

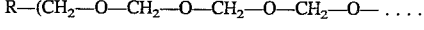

$$R-(CH_2-O-CH_2-O-CH_2-O-CH_2-O-\ldots$$

8. The process of claim 1 wherein the molding parameters for the feedstock are

| SCREW SPEED     | (RPM) | 30 to 60 rpm          |
|-----------------|-------|-----------------------|
| SCREW TEMPERATURE | (°F.) | 375/355/340/320° F.  |
|                 | (°C.) | 190/180/170/160° C.   |
| BACK PRESSURE   | (PSI) | 5 to 15 psi           |
| MELT CUSHION    | (IN.) | ¼ to ½ inch           |
| DECOMPRESSION   | (IN.) | 0 to ¼ inch           |
| MOLD TEMPERATURE | (°F.) | 230 to 300° F.        |
|                 | (C.)  | 110 to 150° C.        |

9. The process of claim 1 wherein the catalyst is an acid.

10. The process of claim 9 wherein the acid is selected from the group consisting of nitric acid, $BF_3$, organic acids, and mixtures thereof.

11. The process of claim 10 wherein the acid is nitric acid.

12. The process of claim 11 wherein the nitric acid is present in a concentration of at least about 70% by volume.

13. The process of claim 1 wherein debinding is effected at a temperature of about 150° F. below the softening point of the binder.

14. A process for controlling debinding of a powder injection molded part formed of a powder injection molding feedstock which includes a polymeric binder, said process comprising:
   (a) placing the molded part to be debound in a continuous debinding oven;
   (b) continuously introducing a purge gas into the oven so as to purge the oven with the purge gas;
   (c) heating the oven to an oven operating temperature below the softening point of the polymeric binder; and
   (d) continuously introducing a debinding catalyst into the oven to effect debinding of the molding feedstock and to form a debound mold and formaldehyde; and
   (e) controlling the debinding rate of the molded part by controlling the catalyst level within the oven, wherein
   (f) the catalyst level within the oven is controlled by continuously controlling at least one of (i) the volumetric rate at which the purge gas is introduced into the oven, and (ii) the volumetric rate at which the catalyst is introduced into the oven, and wherein said process further comprises
   (g) circulating said purge gas and catalyst throughout the oven;, and
   (h) eliminating the reaction product of the debinding reaction via an afterburner.

15. The process of claim 14, wherein the molding feedstock is a metal.

16. The process of claim 15, additionally comprising sintering the debound mold to form a metallic molded product.

17. The process of claim 1 wherein the molding feedstock is a ceramic.

18. The process of claim 14 wherein the oven is heated to temperatures between about 200° to about 300° F.

19. The process of claim 14 wherein the polymer is a polyacetal polymer.

20. The process of claim 19 wherein the polyacetal polymer is based on the formula

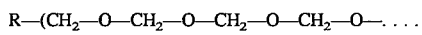

R—(CH$_2$—O—CH$_2$—O—CH$_2$—O—CH$_2$—O—. . . .

21. The process of claim 14 wherein the molding parameters for the feedstock are

| SCREW SPEED | (RPM) | 30 to 60 rpm |
| --- | --- | --- |
| SCREW TEMPERATURE | (°F.) | 375/355/340/320° F. |
| | (°C.) | 190/180/170/160° C. |
| BACK PRESSURE | (PSI) | 5 to 15 psi |
| MELT CUSHION | (IN.) | ¼ to ½ inch |
| DECOMPRESSION | (IN.) | 0 to ¼ inch |
| MOLD TEMPERATURE | (°F.) | 230 to 300° F. |
| | (C.) | 110 to 150° C. |

22. The process of claim 14 wherein the catalyst is an acid.

23. The process of claim 22 wherein the acid is selected from the group consisting of nitric acid, BF$_3$, organic acids, and mixtures thereof.

24. The process of claim 23 wherein the acid is nitric acid.

25. The process of claim 24 wherein the nitric acid is present in a concentration of at least about 70% by volume.

26. The process of claim 14 wherein debinding is effected at a temperature of about 150° F. below the softening point of the binder.

27. The process of claim 1, further comprising circulating the purge gas and catalyst throughout the oven.

28. The process of claim 1, further comprising eliminating the reaction product of the debinding reaction by an afterburner.

* * * * *